(12) United States Patent
Leeman et al.

(10) Patent No.: US 9,142,899 B2
(45) Date of Patent: Sep. 22, 2015

(54) APPARATUS AND METHODS FOR POWERING MOTOR CONTROL CENTERS USING BACKFEED MODULES

(71) Applicant: Eaton Corporation, Cleveland, OH (US)

(72) Inventors: Daniel Jason Leeman, Fuquay-Varina, NC (US); Robert Allan Morris, Fayetteville, NC (US)

(73) Assignee: Eaton Corporation, Cleveland, OH (US)

( * ) Notice: Subject to any disclaimer, the term of this patent is extended or adjusted under 35 U.S.C. 154(b) by 330 days.

(21) Appl. No.: 13/871,753

(22) Filed: Apr. 26, 2013

(65) Prior Publication Data

US 2014/0321067 A1    Oct. 30, 2014

(51) Int. Cl.
| | |
|---|---|
| *H02J 9/00* | (2006.01) |
| *H01R 13/00* | (2006.01) |
| *H02J 9/04* | (2006.01) |
| *H02B 11/167* | (2006.01) |
| *H02B 11/173* | (2006.01) |
| *H02B 11/12* | (2006.01) |

(52) U.S. Cl.
CPC ............... *H01R 13/00* (2013.01); *H02B 11/12* (2013.01); *H02B 11/167* (2013.01); *H02B 11/173* (2013.01); *H02J 9/00* (2013.01); *H02J 9/04* (2013.01)

(58) Field of Classification Search
CPC .............. H02J 9/00; H02J 9/04; H02B 11/12; H02B 11/167; H02B 11/173
See application file for complete search history.

(56) References Cited

U.S. PATENT DOCUMENTS

| | | | | |
|---|---|---|---|---|
| 5,581,133 | A * | 12/1996 | Smith et al. | 307/64 |
| 5,623,135 | A * | 4/1997 | Hashimoto et al. | 200/50.21 |
| 7,450,369 | B2 * | 11/2008 | Wilkie et al. | 361/642 |
| 7,599,171 | B1 * | 10/2009 | Remmert | 361/631 |
| 7,616,432 | B2 * | 11/2009 | Luebke et al. | 361/631 |
| 8,054,606 | B2 | 11/2011 | Morris et al. | |
| 8,199,022 | B2 | 6/2012 | Morris et al. | |
| 8,456,806 | B2 * | 6/2013 | Cosley et al. | 361/622 |
| 2011/0149480 | A1 | 6/2011 | Leeman et al. | |
| 2011/0260538 | A1 * | 10/2011 | Huang | 307/64 |

* cited by examiner

*Primary Examiner* — Ramon Barrera
(74) *Attorney, Agent, or Firm* — Myers Bigel Sibley & Sajovec, P.A.

(57) ABSTRACT

A power backfeed apparatus includes a housing configured be removably positioned in a compartment of a motor control center (MCC), a contact assembly supported by the housing and comprising at least one contact configured to face a corresponding at least one power conductor of the MCC when the housing is disposed in the compartment and a power cable connector supported by the housing and configured to support connection of an external power cable thereto when the housing is disposed in the compartment, the power cable connector configured to be electrically coupled to the at least one contact of the contact assembly. A contact engagement mechanism forces the at least one contact into contact with the at least one power conductor to electrically couple the at least one contact and the at least one power conductor.

20 Claims, 7 Drawing Sheets

APPARATUS AND METHODS FOR POWERING MOTOR CONTROL CENTERS USING BACKFEED MODULES

FIELD

The inventive subject matter relates generally to motor control centers and methods of operation thereof and, more particularly, to apparatus and methods for providing power to motor control centers.

BACKGROUND

Motor control centers (MCCs) are assemblies designed to contain motor starters, variable frequency drives, programmable controllers, meters and other industrial electrical equipment. MCCs are commonly used in manufacturing facilities, power plants and other industrial locations.

A typical MCC includes one or more cabinet-like enclosures, each including a plurality of compartments or "buckets" configured to receive motor controllers and/or other types of modules. MCCs typically include one or more power bus bars to which these modules are connected. For example, a module may include "stab" contacts that extend from a rear face of the module and that are configured to engage power bus bars located proximate a rear section of the bucket into which the module is placed. These contacts may be moveable and may be actuated to engage with and disengage from the power bus bars using a motor drive and/or a tool interface at a front face of the module. MCC and module configurations are described, for example, in U.S. Pat. No. 8,054,606 to Morris et al. and U.S. Patent Application Publication No. 2011/0149480 to Leeman et al.

Within a given MCC, certain loads may be more critical than others. For example, in a nuclear power plant, motor controllers that control motor operated valves (MOVs) that control flow of cooling water to the reactors may be more critical than other loads. Under emergency conditions, it is generally desirable to keep these critical loads on line. Accordingly, nuclear power plants typically have redundant power systems that are configured to power critical loads from a secondary power source, such as a permanently-installed backup diesel engine-generator set. Unfortunately, however, these secondary power systems may also fail, as was the case, for example, in the Fukushima Daiichi nuclear disaster of 2011.

SUMMARY

Some embodiments of the inventive subject matter provide a power backfeed apparatus including a housing configured be removably positioned in a compartment of a motor control center (MCC) and a contact assembly supported by the housing and comprising at least one contact configured to face a corresponding at least one power conductor of the MCC when the housing is disposed in the compartment. The apparatus also includes a power cable connector supported by the housing and configured to support connection of an external power cable thereto, with the power cable connector being configured to be electrically coupled to the at least one contact of the contact assembly. The apparatus further includes a contact engagement mechanism configured to force the at least one contact into contact with the at least one power conductor to electrically couple the at least one contact and the at least one power conductor and thereby support provision of power from the power cable connector to the at least one power conductor of the MCC.

In some embodiments, the at least one contact may be fixed in relation to the housing and the contact engagement mechanism may be configured to force the housing toward the at least power conductor to cause the at least one contact to engage the at least one power conductor. The contact engagement mechanism may include a surface configured to contact a door of the compartment such that closing the door forces the housing toward the at least one power conductor to engage the at least one contact with the at least one power conductor of the MCC. The contact engagement mechanism may include a member, such as a spring-loaded plunger, extending from a face of the housing and having a surface configured to engage the door of the compartment. In some embodiments, the contact assembly may include a plurality of elongate members extending from a face of the housing and the at least one contact may include a plurality contacts, respective ones mounted at ends of respective ones of the elongate members.

In further embodiments, the contact assembly may include a moveable contact assembly. The contact engagement mechanism may include an actuator configured to move the moveable contact assembly to cause motion of the at least one contact relative to the housing. The actuator may be manual and/or motorized, and may be remotely operable using, for example, a wired or wireless control link or manual cable.

The contact assembly may include a moveable body comprising a plurality elongate members and the at least one contact may include a plurality contacts, respective ones mounted proximate ends of respective ones of the elongate members. The contact engagement mechanism may be configured to move the body and cause the elongate members to retractably extend through a face of the housing.

In some embodiments, the apparatus may further include a disconnect device supported by the housing and configured to couple and decouple the at least one contact and the power cable connector. The disconnect device may include a manual actuator accessible at a front face of the housing. The disconnect device may be remotely operable.

Further embodiments of the inventive subject matter provide a power backfeed apparatus including a housing configured be removably positioned in a compartment of an MCC and a contact assembly comprising at least one member mounted at a rear face of the housing and at least one contact supported by the at least one member and facing towards at least one power conductor of the MCC when the housing is disposed in the compartment. The apparatus also includes a power cable connector supported by the housing and configured to support connection of an external power cable to the power cable connector. The power cable connector is configured to be electrically coupled to the at least one contact of the contact assembly. The apparatus further includes a member supported by the housing and configured to engage a door of the compartment such that closure of the door moves the housing and forces the at least one contact into contact with the at least one power conductor to electrically couple the at least one contact and the at least one power conductor and thereby support provision of power from the power cable connector to the at least one power conductor of the MCC. The member may include a spring-loaded plunger mounted at a face of the housing.

Further embodiments provide methods of operating an MCC. The methods include positioning a backfeed module in a compartment of the MCC, connecting an external power cable to a power cable connector of the backfeed module and forcing at least one contact of the backfeed module into contact with at least one power conductor of the MCC in the compartment to electrically couple the at least one contact and the at least one power conductor and thereby support provision of power from the external power cable to the at least one power conductor of the MCC. In some embodiments, forcing at least one contact of the backfeed module into contact with at least one power conductor of the may include closing a door of the compartment such that contact of the door with a surface of the module moves the module and forces engagement of the at least one contact with the at least one power conductor. In further embodiments, forcing at least one contact of the backfeed module into contact with at least one power conductor of the may include actuating a moveable contact assembly of the backfeed module.

DETAILED DESCRIPTION

Figure 1:
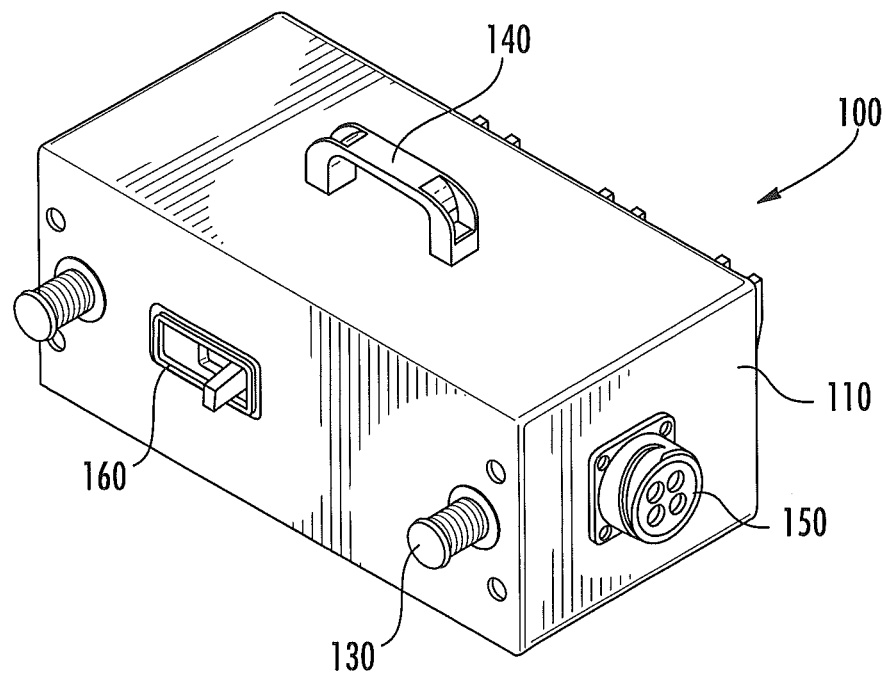
FIGS. 1-3 are views illustrating a backfeed module for an MCC according to some embodiments of the inventive subject matter.

The inventive subject matter now will be described more fully hereinafter with reference to the accompanying drawings, in which illustrative embodiments of the inventive subject matter are shown. In the drawings, the relative sizes of regions or features may be exaggerated for clarity. This inventive subject matter may, however, be embodied in many different forms and should not be construed as limited to the embodiments set forth herein; rather, these embodiments are provided so that this disclosure will be thorough and complete, and will fully convey the scope of the inventive subject matter to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout. As used herein the term "and/or" includes any and all combinations of one or more of the associated listed items.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

The terminology used herein is for the purpose of describing particular embodiments only and is not intended to be limiting of the inventive subject matter. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the expression "and/or" includes any and all combinations of one or more of the associated listed items.

Unless otherwise defined, all terms (including technical and scientific terms) used herein have the same meaning as commonly understood by one of ordinary skill in the art to which this inventive subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Some embodiments of the inventive subject matter arise from a realization that power may be provided to an MCC in emergency situations using a backfeed module configured to be inserted into an MCC compartment and to provide power to the power conductors (e.g., bus bars) of the MCC from an external power source, such as a portable generator, connected to the module via a power cable connector. In some embodiments, the module may be designed to engage the power bus bars of the MCC using contacts that are configured to be forced against the bus(es) by closing a compartment door. In further embodiments, a manually and/or electrically driven actuator may force contacts of the module to engage with the MCC power bus bars, thus allowing an operator to connect the module to the bus at a safe distance. The module may include a circuit interruption device, such as circuit breaker.

Figure 2:
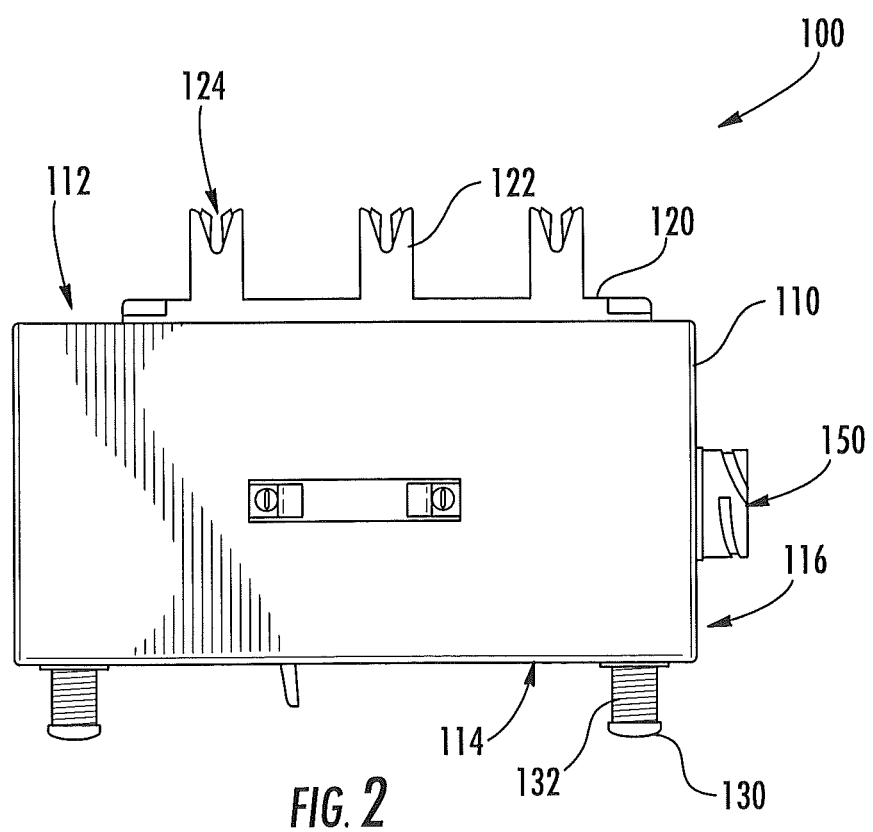
Figure 3:
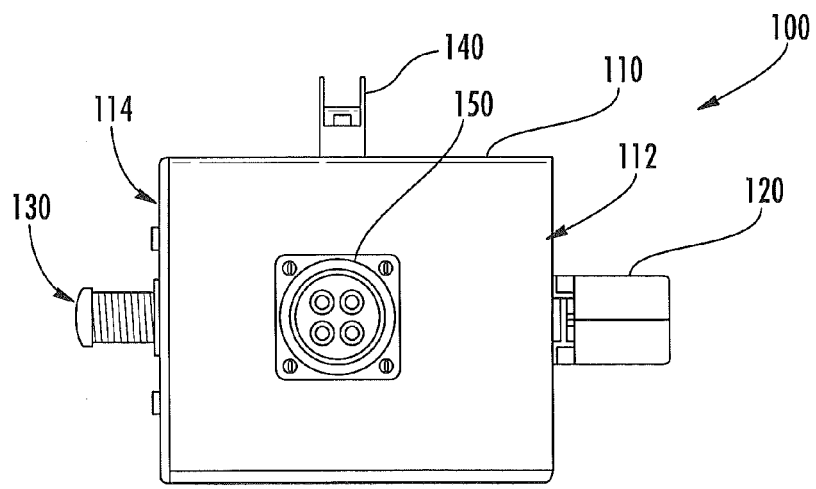

FIGS. 1-3 illustrate a backfeed module 100 for an MCC according to some embodiments. The module 100 includes a housing 110 configured to be inserted in a compartment or bucket of an MCC. Spring-loaded plunger assemblies 130 are mounted at a front face 114 of the housing. A power cable connector 150 is mounted at a side face 116 of the housing. It will be appreciated that the power cable connector 150 may be mounted at a different face of the housing 110, such as the front face 114, depending on access requirements. A handle 140 may be attached to the housing 110 to ease carrying of the module 100.

Figure 4:
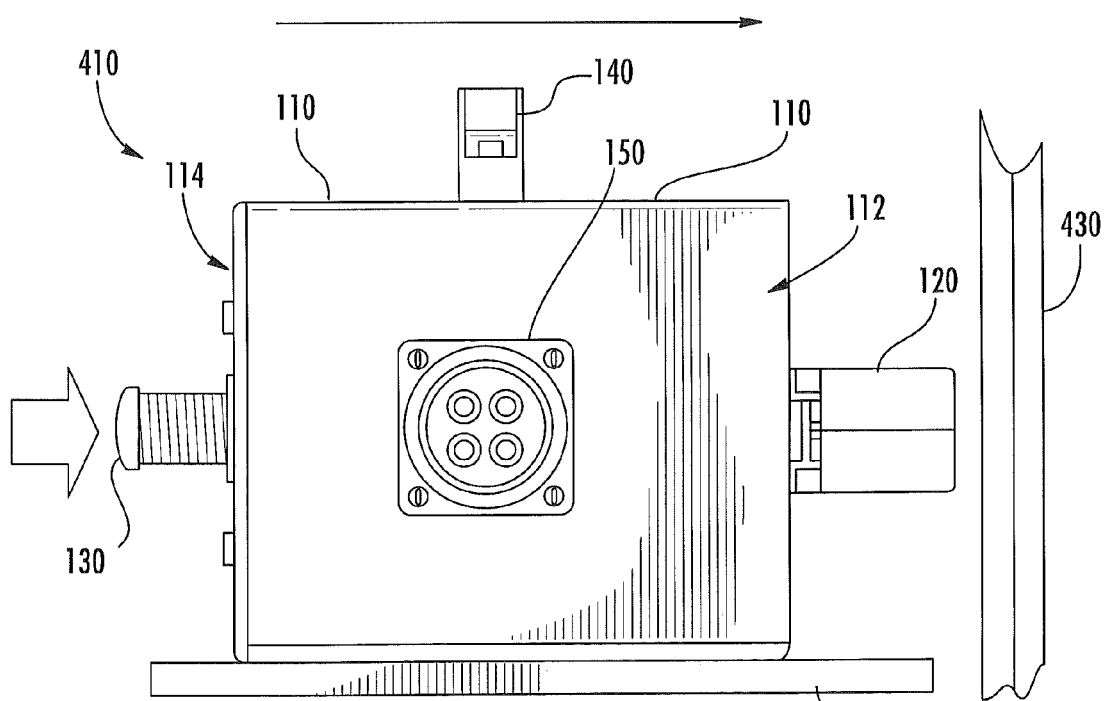
FIG. 4 illustrates a typical installation of the backfeed module of FIGS. 1-3 in a compartment of an MCC.
Figure 5:
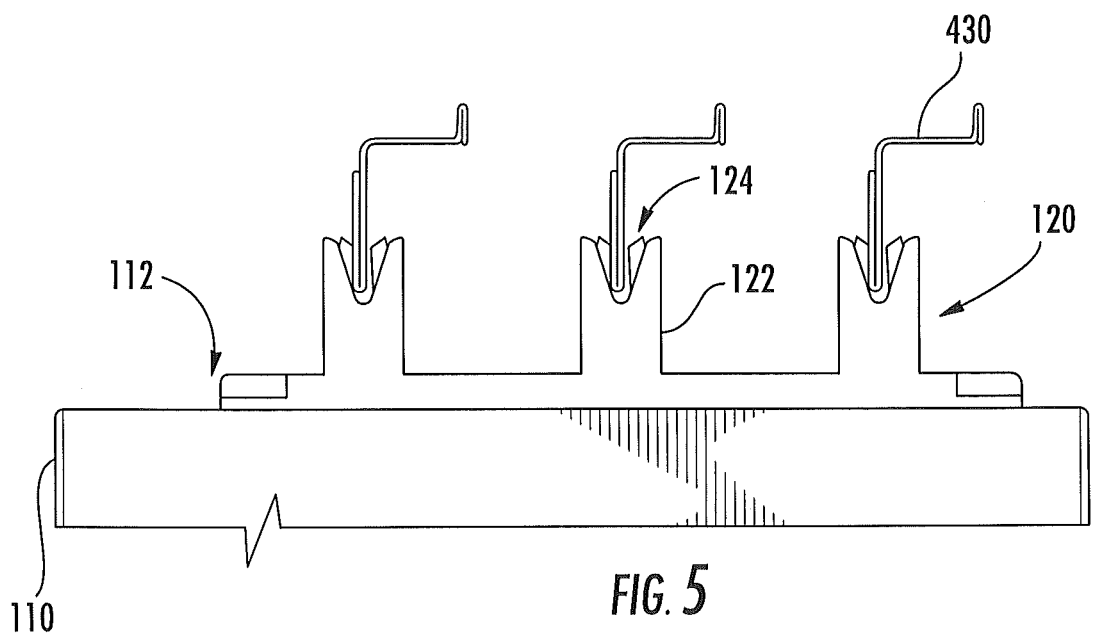
FIG. 5 is a detailed view of a stab assembly of the backfeed module of FIGS. 1-3 engaged with power bus bars of an MCC.

Referring to FIGS. 2-5, a stab contact assembly 120 is mounted at a rear face 112 of the housing 110. The stab contact assembly 120 includes a plurality of elongate members 122 which extend away from the rear face 112. Stab contacts 124 are mounted proximate ends of the members 122. As shown in FIGS. 4 and 5, the module 110 is configured such that, when the module 110 is inserted into a compartment 410 of an MCC, the module 110 rests on a supporting surface 440 (e.g., a shelf) and may slide toward a power bus bars 430 of the MCC. Referring to FIG. 5, the stab assembly 120 is configured such that respective ones of the stab contacts 124 engage respective ones of the bus bars 430. As shown in FIG. 4, this engagement may be effected by applying force to the spring-loaded plunger assemblies 130 mounted at the front face 114 of the module 110.

The contacts 124 of the contact assembly 120 are configured to be electrically coupled to the power cable connector 150 to support provision of power to the bus bars 430 from a power source coupled to the power cable connector 150. The connection between the power cable connector 150 and the contacts 124 may be direct (e.g., via wires or other conductors) or, as further shown in FIGS. 1-3, the module 100 may further include a disconnect device, here shown as a switch 160, configured to couple and decouple the contacts 124 to and from the power cable connector 150. As shown, the switch 160 may be manually actuated using a handle accessible at the front face 114 of the housing 110. In some embodiments, the disconnect device may be remotely actuated using, for example, a motor drive, cable or similar mechanism. The disconnect device 160 may simply function as a switch or may be a circuit breaker or similar device that provides automatic circuit interruption capabilities.

Figure 6:
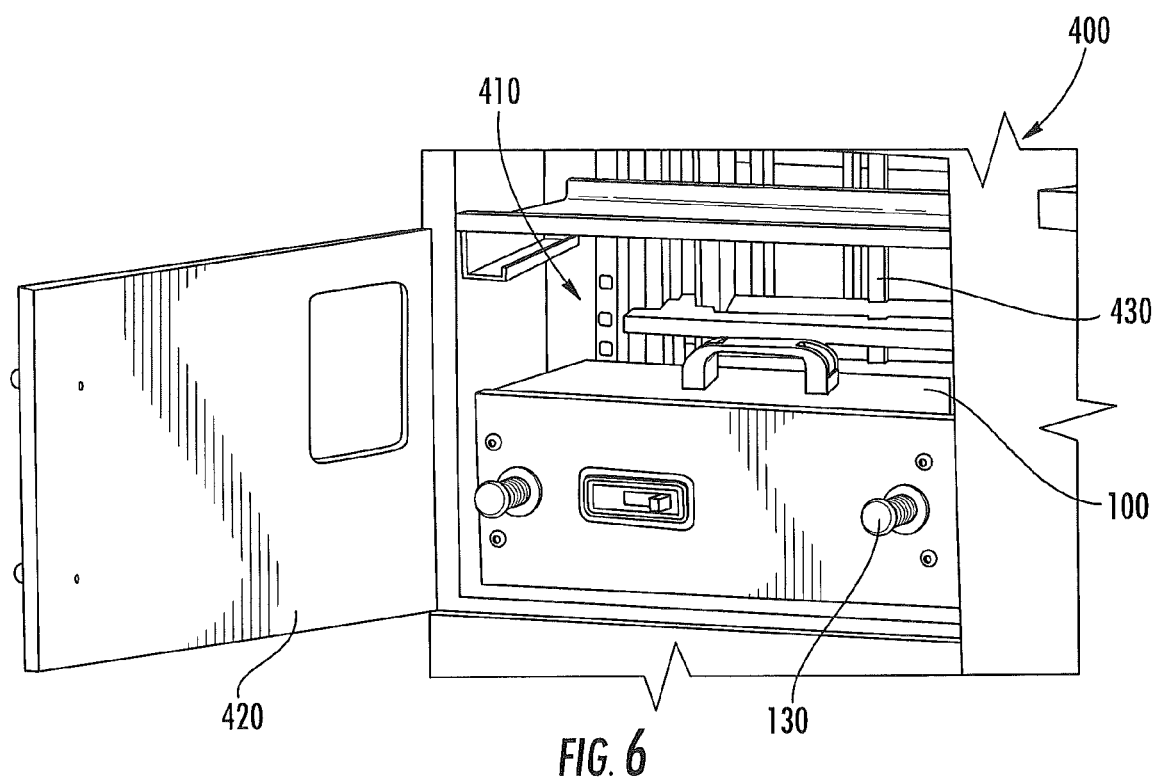
FIG. 6 is a block diagram illustrating components of a backfeed module according to further embodiments of the inventive subject matter.
Figure 7:
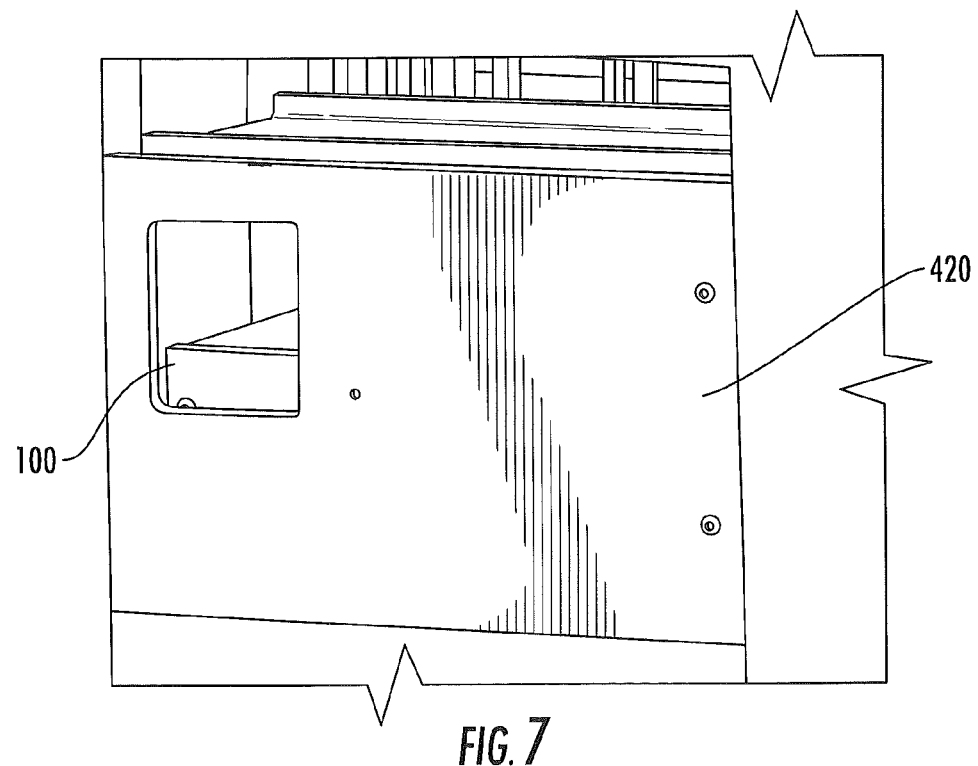

FIGS. 6 and 7 illustrate installation of the backfeed module 100 in a compartment 410 of an MCC 400. Power bus bars 430 are positioned in a rear section of the compartment 410. When a door 420 of the compartment is closed, the door 420 contacts the spring-loaded plungers 130 extending from the backfeed module 100, forcing the module 110 rearward to engage the bus bars 430 as shown in FIG. 5. The door 420 may be fixed in place by panel screws or other retaining means, causing the stab contacts 124 of the module to be maintained in contact with the bus bars 430 in a spring loaded fashion. A power cable may be routed through internal spaces of the MCC 440 to connect to the power cable connector 150 of the module 110 and/or access to the power cable connector 150 may be provide via a cutout in the door 420. Cutouts in the door 420 may also provide access to the disconnect switch 160.

Figure 8:
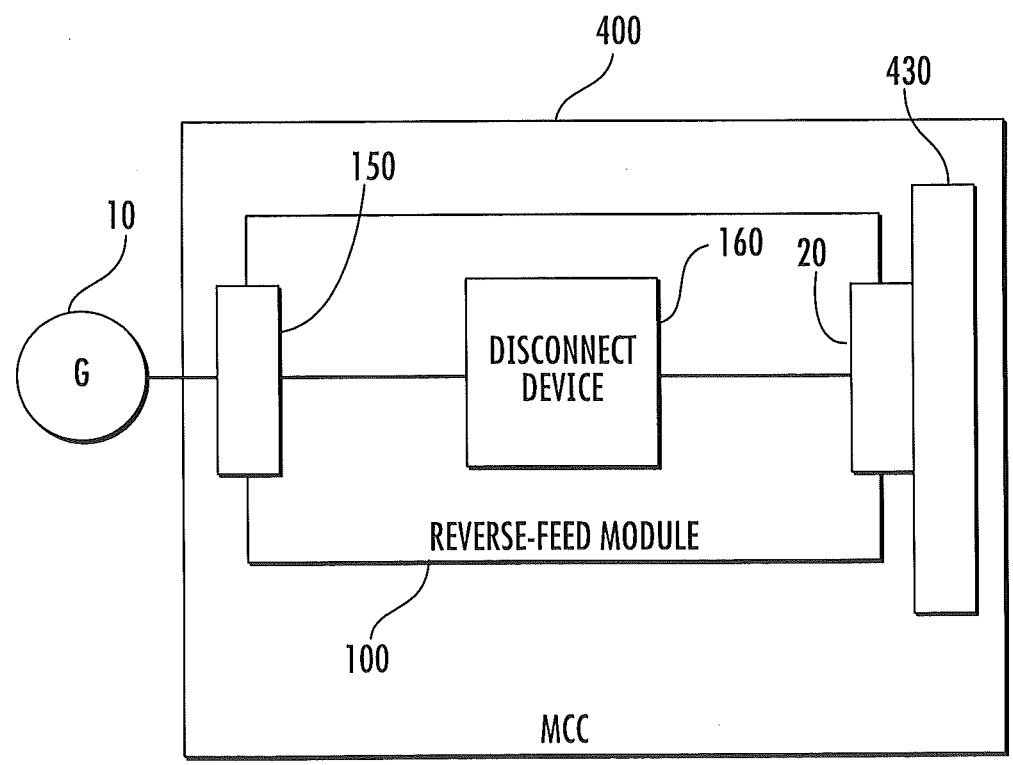
FIGS. 7 and 8 illustrate operations for installing the backfeed module of FIGS. 1-5 in an MCC according to further embodiments of the inventive subject matter.

FIG. 8 is a schematic block diagram illustrating electrical connections of the module 100 within the MCC 400 according to some embodiments. An external generator 10, for example, a portable engine/generator set, is coupled to an input of the disconnect device 160 via the power cable connector 150. An output of the disconnect device 160 is coupled to the stab contact assembly 120, which engages one or more bus bars 430 of the MCC 400. It will be appreciated that the connections may be single or multi-phase. It will also be appreciated that the module 100 may include other electrical and/or electronic components, such as current and/or voltage sensors. The module 100 may also include r communications circuitry (wireline or wireless) for communicating information from such sensors and/or other status information. Such other status information may relate, for example, to the state of connection of the module to the bus bars 430, the state of the external power source coupled to the power cable connector 150 and/or the state of the disconnect device 160. The module 150 may also include display components that provide local indication of such information at the module 100 using, for example, displays or other indicators mounted at the front face 114 of the module 100.

Figure 9:
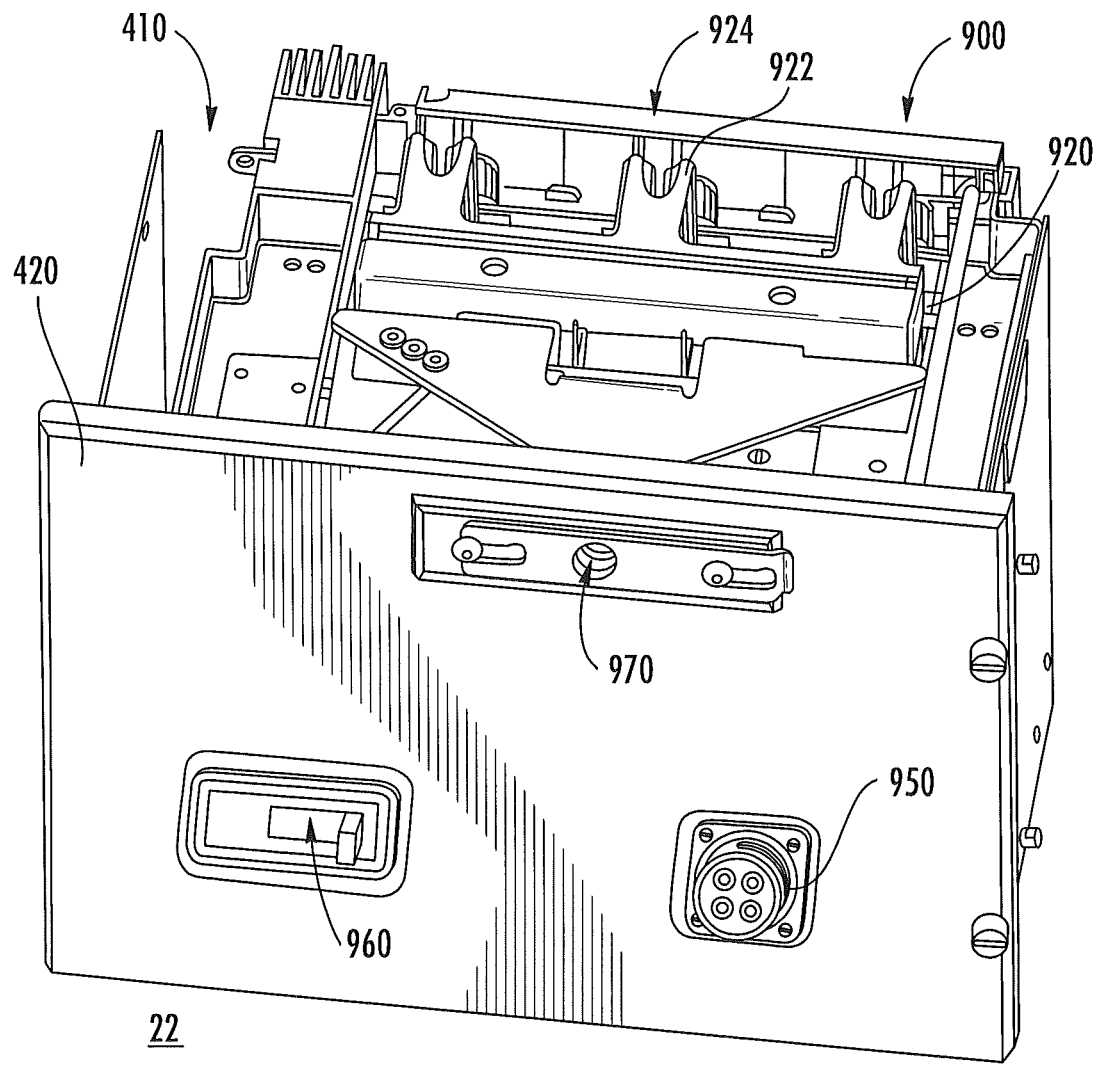
FIG. 9 is a perspective view of a back feed module with a manually actuated stab assembly according to some embodiments of the inventive subject matter.

In further embodiments, a backfeed module may use moveable contact assemblies similar to those used in other MCC modules. For example, FIG. 9 illustrates a backfeed module 900 configured to be installed in a compartment 410 of an MCC, behind a door 420. The backfeed module 900 includes a manually actuated retractable stab contact assembly 920 comprising a plurality of members 920 which may be moved towards a rear of the module 900 using a wrench-like tool inserted in a tool interface 970 via a cutout in the door 420. Cutouts in the door 420 may also provide access to a power cable connector 950 and a disconnect switch 960 of the module 900. The module 900 may include, for example, a screw-type actuator which, when rotated by the inserted tool, drives the stab contact assembly 920 towards bus bars of the MCC inside the compartment 410, such that contacts 924 engage the bus bars. The moveable contact assembly 920 and the mechanism that drives it may be similar to, for example, mechanisms described in U.S. Pat. No. 8,199,022 to Morris et al., the disclosure of which is incorporated herein by reference in its entirety.

Figure 10:
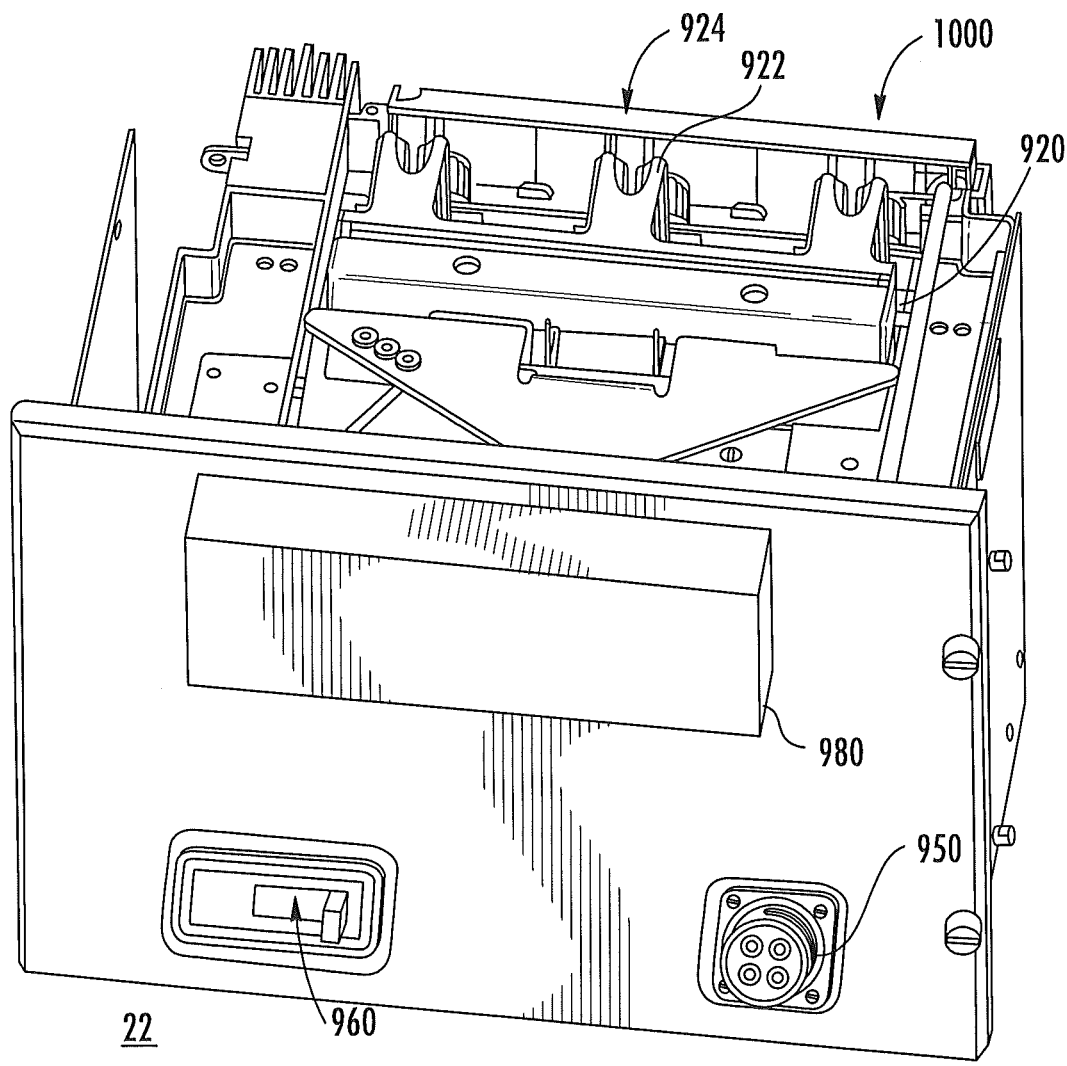
FIG. 10 is a perspective view of a back feed module with a remotely actuated stab assembly according to further embodiments.

In still further embodiments, a remotely operated contact drive assembly may be used to allow an operator to remotely actuate bus bar contacts of a backfeed module to increase installation safety. FIG. 10 illustrates an example of such a backfeed module 1000 configured to be installed in a compartment 410 of an MCC, behind a door 420. The backfeed module 1000 includes a moveable stab contact assembly 920 comprising a plurality of members 920, which may be driven towards a rear of the module 1000 by a remotely-controlled driver mechanism 980. The driver mechanism 980 may include, for example, a rotary motor configured to drive a screw mechanism that moves the contact assembly 920 or a linear motor configured to directly drive the contact assembly 920. The motor may be electrically powered via the power cable connector 950 and may be controlled, for example, via a wired or wireless control link. The moveable contact assembly 920 and the mechanism that drives it may be similar, for example, to the movable contact mechanisms described in U.S. Pat. No. 8,054,606 to Morris et al., the disclosure of which is incorporated herein by reference in its entirety. In some embodiments, the driver mechanism 980 may be manually actuated using, for example, a rotary cable that drives a drive screw shaft that moves the stab contact assembly 920.

Figure 11:
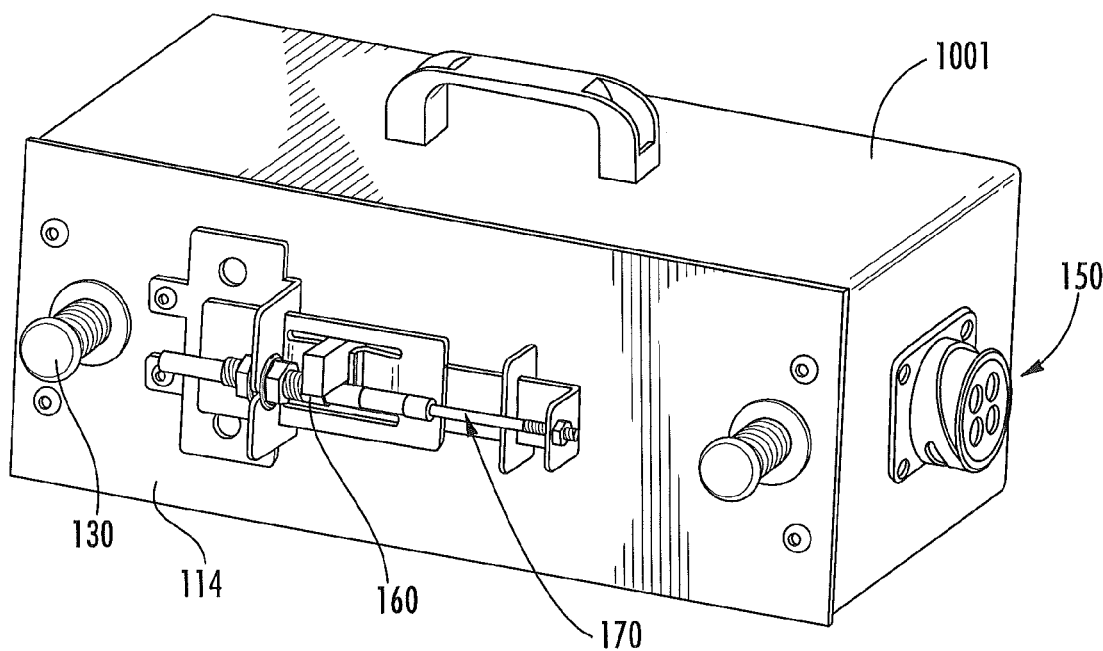
FIG. 11 is a perspective view of a back feed module with a cable-activated disconnect switch according to further embodiments.

In additional embodiments, a backfeed module as described above may also include an actuator configured to provide remote operation of a disconnect device of the module. Such an actuator may include, for example, an electrical motor drive or a cable-driven mechanism (e.g., a Bowden push-pull type cable or rotary cable mechanism). For example, FIG. 11 illustrates a backfeed module 100' including a housing 110, power cable connector 150, spring-loaded plunger assemblies 130 and disconnect device 160 mounted at a front face 114 of the housing. The module 100' further comprises a push-pull cable actuator assembly 170, which is configured to allow a user to actuate the disconnect device 160 from a location removed from the module 100'. It will be appreciated that other embodiments may use different remote actuator mechanisms, such as motor-driven actuators controlled by wired and/or wireless control links.

In the drawings and specification, there have been disclosed exemplary embodiments of the inventive subject matter. However, many variations and modifications can be made to these embodiments without substantially departing from the principles of the present inventive subject matter. Accordingly, although specific terms are used, they are used in a generic and descriptive sense only and not for purposes of limitation, the scope of the inventive subject matter being defined by the following claims.

That which is claimed:
1. A power backfeed apparatus comprising:
a housing configured to be removably positioned in a compartment of a motor control center (MCC);

a contact assembly supported by the housing and comprising at least one contact configured to face a corresponding at least one power conductor of the MCC when the housing is disposed in the compartment;

a power cable connector supported by the housing and configured to support connection of an external power cable thereto, the power cable connector configured to be electrically coupled to the at least one contact of the contact assembly; and a contact engagement mechanism configured to force the at least one contact into contact with the at least one power conductor to electrically couple the at least one contact and the at least one power conductor and thereby support provision of power from the power cable connector to the at least one power conductor of the MCC.

2. The apparatus of claim 1, wherein the at least one contact is fixed in relation to the housing and wherein the contact engagement mechanism is configured to force the housing toward the at least one power conductor to cause the at least one contact to engage the at least one power conductor.

3. The apparatus of claim 2, wherein the contact assembly comprises a plurality of elongate members extending from a face of the housing and wherein the at least one contact comprises a plurality contacts, respective ones mounted at ends of respective ones of the elongate members.

4. The apparatus of claim 2, wherein the contact engagement mechanism comprises a surface configured to contact a door of the compartment such that closing the door moves the housing to engage the at least one contact with the at least one power conductor of the MCC.

5. The apparatus of claim 4, wherein the contact engagement mechanism comprises a member extending from a face of the housing.

6. The apparatus of claim 5, wherein the contact engagement mechanism comprises a spring-loaded plunger mounted at a face of the housing.

7. The apparatus of claim 1, wherein the contact assembly comprises a moveable contact assembly and wherein the contact engagement mechanism comprises an actuator configured to move the moveable contact assembly to cause motion of the at least one contact relative to the housing.

8. The apparatus of claim 7, wherein the actuator comprises a motor.

9. The apparatus of claim 7, wherein the actuator is manual.

10. The apparatus of claim 7, wherein the actuator is remotely operable.

11. The apparatus of claim 7, wherein the contact assembly comprises a moveable body comprising a plurality elongate members extending toward the rear face of the housing, wherein the at least one contact comprises a plurality contacts, respective ones mounted proximate ends of respective ones of the elongate members, and wherein the contact engagement mechanism is configured to move the body towards the rear face of the housing to cause the elongate members to retractably extend from a face of the housing.

12. The apparatus of claim 1, further comprising a disconnect device supported by the housing and configured to couple and decouple the at least one contact and the power cable connector.

13. The apparatus of claim 12, wherein the disconnect device is configured to be manually actuated.

14. The apparatus of claim 12, wherein the disconnect device is remotely operable.

15. A power backfeed apparatus comprising:

a housing configured to be removably positioned in a compartment of an MCC;

a contact assembly comprising at least one member mounted at a face of the housing and at least one contact supported by the at least one member and facing towards at least one power conductor of the MCC when the housing is disposed in the compartment;

a power cable connector supported by the housing and configured to support connection of an external power cable to the power cable connector, the power cable connector configured to be electrically coupled to the at least one contact of the contact assembly; and a member supported by the housing and configured to engage a door of the compartment such that closure of the door moves the housing and forces the at least one contact into contact with the at least one power conductor to electrically couple the at least one contact and the at least one power conductor and thereby support provision of power from the power cable connector to the at least one power conductor of the MCC.

16. The apparatus of claim 15, wherein the member comprises a spring-loaded plunger mounted at a face of the housing.

17. A method of operating an MCC, the method comprising:

positioning a backfeed module in a compartment of the MCC;

connecting a power cable from a power source external to the MCC to a power cable connector of the backfeed module; and forcing at least one contact of the backfeed module into contact with at least one power conductor of the MCC in the compartment to electrically couple the at least one contact and the at least one power conductor and thereby support provision of power from the external power cable to the at least one power conductor of the MCC.

18. The method of claim 17, wherein forcing at least one contact of the backfeed module into contact with at least one power conductor of the comprises closing a door of the compartment such that contact of the door with a surface of the module moves the module and forces engagement of the at least one contact with the at least one power conductor.

19. The method of claim 17, wherein forcing at least one contact of the backfeed module into contact with at least one power conductor comprises actuating a moveable contact assembly of the backfeed module.

20. The method of claim 19, wherein actuating a moveable contact assembly of the backfeed module comprises remotely actuating the moveable contact assembly.

* * * * *